(12) United States Patent
Tsunekawa (10) Patent No.: US 8,739,615 B2
(45) Date of Patent: Jun. 3, 2014

(54) DEVICE AND METHOD OF DETERMINING DETERIORATION OF CATALYST

(71) Applicant: Mitsubishi Jidosha Kogyo Kabushiki Kaisha, Tokyo (JP)

(72) Inventor: Kiyoka Tsunekawa, Tokyo (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 21 days.

(21) Appl. No.: 13/743,804

(22) Filed: Jan. 17, 2013

(65) Prior Publication Data

US 2013/0228008 A1    Sep. 5, 2013

(30) Foreign Application Priority Data

Mar. 5, 2012 (JP) ................. 2012-048310

(51) Int. Cl.
   *G01M 15/10* (2006.01)
   *F01N 3/10* (2006.01)
   *F01N 11/00* (2006.01)

(52) U.S. Cl.
   CPC ............... *G01M 15/10* (2013.01); *F01N 3/105* (2013.01); *F01N 11/007* (2013.01)
   USPC ..................................................... 73/114.75

(58) Field of Classification Search
   CPC ....... Y02T 10/47; F01N 11/00; F01N 11/002; F01N 11/007; F01N 2560/025; F01N 3/105; G01M 15/00; G01M 15/10
   USPC ..................................................... 73/114.75
   See application file for complete search history.

(56) References Cited

U.S. PATENT DOCUMENTS

| 6,170,260 | B1 | 1/2001 | Ishii et al. |
| 6,834,497 | B2 * | 12/2004 | Miyoshi et al. ................. 60/277 |
| 7,424,801 | B2 * | 9/2008 | Mukaihira et al. .............. 60/277 |
| 7,712,303 | B2 | 5/2010 | Tanada et al. |
| 8,091,404 | B2 * | 1/2012 | Sawada et al. ................. 73/1.06 |
| 8,490,476 | B2 * | 7/2013 | Hopka et al. ............... 73/114.75 |
| 8,555,619 | B2 * | 10/2013 | Park ................................ 60/295 |
| 2006/0236678 | A1 | 10/2006 | Tanada et al. |

FOREIGN PATENT DOCUMENTS

| JP | 11-82003 A | 3/1999 |
| JP | 2006-118358 A | 5/2006 |
| JP | 4466451 B2 | 5/2010 |

* cited by examiner

*Primary Examiner* — Freddie Kirkland, III
(74) *Attorney, Agent, or Firm* — Birch, Stewart, Kolasch & Birch, LLP (57) ABSTRACT

A catalyst determining device includes an oxidation catalyst disposed in an outlet passage in an engine, the oxidation catalyst including an adsorption substance for adsorbing and desorbing an exhaust component in exhaust and a catalytic substance capable of oxidizing the exhaust component, a calculating unit for calculating a difference in oxygen concentration between upstream and downstream of the oxidation catalyst, and a determination unit for determining the deterioration of the oxidation catalyst through comparison of a plurality of the differences in oxygen concentration obtained at different temperatures of the oxidation catalyst by the calculating unit.

9 Claims, 6 Drawing Sheets

DEVICE AND METHOD OF DETERMINING DETERIORATION OF CATALYST

FIELD

The present invention relates to a device and a method of determining the deterioration of an oxidation catalyst disposed in an exhaust passage of an engine.

BACKGROUND

A catalytic converter for eliminating unwanted components in emissions is conventionally provided in an exhaust passage of an engine. Examples of the catalytic converters include oxidation catalysts composed of catalytic substances, such as catalytic metals, e.g., precious metals or transition metals on supports for oxidizing substances such as hydrocarbons or carbon monoxides in emissions and filters for collecting and eliminating particulate matter in emissions. In such oxidation catalysts of the catalytic converters, the supported catalytic substances exhibit oxidation characteristics at temperatures that activate the catalytic substances. At a low emission temperature of the engine, that is, at a low temperature of the catalyst, the oxidation catalyst cannot sufficiently purify the emissions. Specifically, diesel engines have low emission temperatures as compared to gas engines, and thus the temperature of the oxidation catalyst is left at low temperatures for long hours.

As disclosed in Japanese Unexamined Patent Application Publication 11-82003, the oxidation catalysts generally include substances that can adsorb hydrocarbons (HCs) in emissions at low temperatures, such as zeolite or alumina. Oxidation catalysts including such substances are referred to as HC trapping catalysts or adsorption oxidation catalysts and can adsorb HCs in the emissions even at a low temperature of the catalyst to clean the emissions. At a high temperature of the catalyst, adsorbed HCs are desorbed from the catalyst to be oxidized by the catalytic substance and eliminated.

Unfortunately, such a catalytic converter including the oxidation catalysts gradually deteriorates during repeated use, which lowers the performance to purify emissions. To keep an appropriate level of cleaning of emissions, accurate determination of the degree of deterioration of the catalytic converter is necessary. Examples of the approach that determines the deterioration of oxidation catalysts capable of oxidation and both adsorption and desorption of HCs are disclosed in Japanese Unexamined Patent Application Publication 2006-118358 and Japanese Patent No. 4466451.

Determination of the deterioration of the oxidation catalysts that can perform both oxidation and adsorption/desorption of HCs requires appropriately specifying the factor causing the deterioration, i.e., a decrease in oxidation performance due to deterioration of the catalytic substance or a decrease in the adsorption/desorption performance due to deterioration of the adsorbable substance.

Unfortunately, the adsorption substance adsorbs HCs at a low temperature of the catalyst; hence, a technique to monitor changes in the temperature of the oxidation catalyst as disclosed in Japanese Unexamined Patent Application Publication 2006-118358 is not suited to such determination of the deterioration of oxidation catalysts. A technique that performs specific control for the determination of deterioration of the catalyst is applicable as is disclosed in Japanese Patent No. 4466451; however, it brings out a demand for a simpler way to determine the deterioration.

SUMMARY

Technical Problems

An object of the present invention, which is designed to address the aforementioned shortcomings, is to provide a device and a method of determining the deterioration of an oxidation catalyst that has oxidation and adsorption/desorption characteristics.

Solution to Problems (1) A catalyst determining device according to the present invention includes an oxidation catalyst disposed in an outlet passage in an engine, the oxidation catalyst comprising an adsorption substance for adsorbing and desorbing an exhaust component in exhaust and a catalytic substance capable of oxidizing the exhaust component, a calculating unit for calculating a difference in oxygen concentration between upstream and downstream of the oxidation catalyst, and a determination unit for determining deterioration of the oxidation catalyst through comparison of a plurality of the differences in oxygen concentration obtained at different temperatures of the oxidation catalyst by the calculating unit.

(2) Preferably, the determination unit determines the deterioration of the adsorption substance based on the plurality of differences in oxygen concentration at the different temperatures of the oxidation catalyst within a range equal to or lower than an oxidation initiation temperature at which oxidation of the exhaust component is initiated in the oxidation catalyst.

(3) Preferably, the determination unit determines the deterioration of the adsorption substance through comparison of the difference in oxygen concentration obtained by the calculating unit at a temperature of the oxidation catalyst lower than a desorption initiation temperature at which the exhaust component initiates desorption from the adsorption component with the difference in oxygen concentration obtained by the calculating unit at another temperature of the oxidation catalyst within a range from the desorption initiation temperature to an oxidation initiation temperature at which oxidation of the exhaust component is initiated in the oxidation catalyst.

(4) Preferably, the determination unit determines the deterioration of the catalytic substance based on the difference in oxygen concentration at a temperature of the oxidation catalyst higher than the oxidation initiation temperature after the determination of deterioration of the adsorption substance, and distinguishes factors causing the deterioration of the oxidation catalyst based on the result of the determination of deterioration of the adsorption substance and the result of the determination of deterioration of the catalytic substance.

(5) Preferably, the determination unit determines the deterioration of the oxidation catalyst if a difference between the plurality of differences in oxygen concentration is lower than a threshold.

(6) Preferably, the determination unit includes a provisional determination unit for provisionally determining possible deterioration of the oxidation catalyst if the difference in oxygen concentration obtained by the calculating unit is lower than a first prescribed value at a temperature of the oxidation catalyst lower than a desorption initiation temperature at which the exhaust component initiates desorption from the adsorption component.

(7) Preferably, the determination unit changes the threshold for the difference between the plurality of differences in oxygen concentration with respect to the determination of deterioration of the oxidation catalyst in response to the result of the provisional determination by the provisional determination unit.

(8) Preferably, the catalyst determining device includes a temperature acquiring unit for acquiring the temperature of the oxidation catalyst, wherein the determination unit differentiates the states of the oxidation catalyst at different temperatures acquired by the temperature acquiring unit. Examples of the temperature acquiring unit include a sensor for detecting the temperature of the oxygen catalyst, a sensor for detecting at least one of the temperatures of the exhaust of upstream and downstream of the oxygen catalyst, and an electronic control unit for estimating the temperature of the oxygen catalyst based on the driving conditions or the environmental conditions (temperature, humidity or atmospheric pressure) of the engine.

(9) According to the disclosed method of determining deterioration of an oxidation catalyst, the oxidation catalyst is disposed in an outlet passage in an engine and includes an adsorption substance for adsorbing and desorbing an exhaust component in exhaust and a catalytic substance capable of oxidizing the exhaust component. The determining method includes calculating a difference in oxygen concentration between upstream and downstream of the oxidation catalyst as a first difference in oxygen concentration if a temperature of the oxidation catalyst is a first temperature, calculating a difference in oxygen concentration between upstream and downstream of the oxidation catalyst as a second difference in oxygen concentration if the temperature of the oxidation catalyst is a second temperature higher than the first temperature, and performing the determination of deterioration of the oxidation catalyst by comparing the first difference in oxygen concentration with the second difference in oxygen concentration.

Advantageous Effects

According to the disclosed device and method of determining the deterioration of a catalyst, a change in the oxygen performance or adsorption and desorption performance with respect to the temperature of the catalyst can be observed by comparing a plurality of difference in oxygen concentration obtained at different temperatures of the catalyst. This allows determination on deterioration of the oxidation catalyst as the oxidation performance or adsorption and desorption performance decreases, thereby properly determining purifying performance of the oxygen catalyst.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

Embodiments of the present invention will now be described hereinafter with reference to the accompanying drawings. The following embodiments are mere examples for description of the present invention; therefore, various modifications of the embodiments are feasible, and applications of the technique are not limited to the following embodiments.

[1. Configuration of Device]

[1-1. Overall Configuration]

Figure 1:
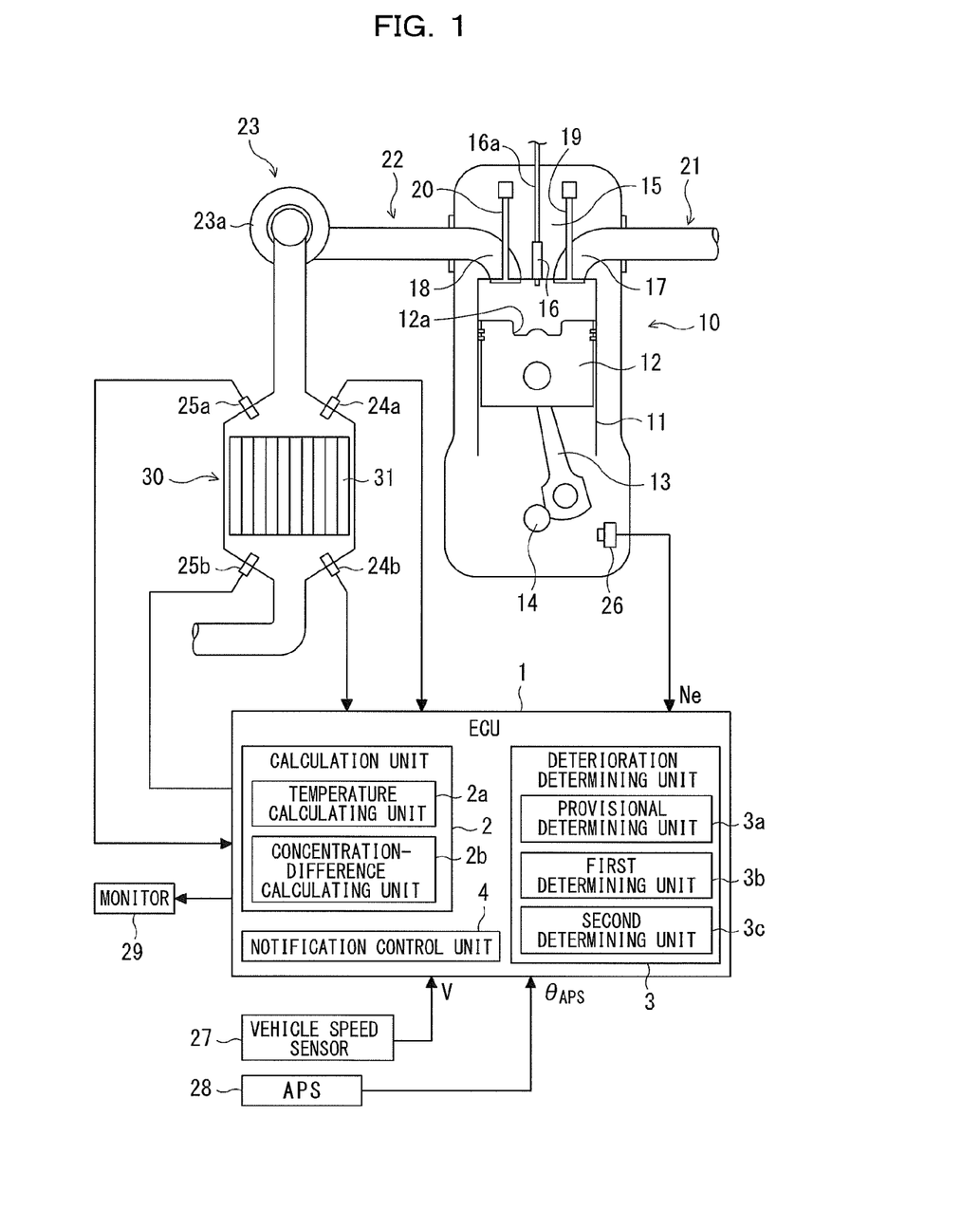
FIG. 1 schematically illustrates the configuration of a catalyst determining device according to an embodiment of the present invention.

With reference to FIG. 1, a catalyst determining device of an embodiment is applied to a diesel engine (engine) 10 provided in a vehicle. FIG. 1 illustrates one of the cylinders 11 provided in the engine 10, and all the cylinders 11 have the same configuration. A piston 12 that vertically reciprocates is provided in the cylinder 11 of the engine 10. The piston 12 is connected to a crankshaft 14 via a connecting rod 13. The piston 12 has a cavity 12a on the top face thereof, the cavity 12a serving as a combustion chamber.

An injector 16 for injecting fuel is provided in a cylinder head 15 disposed over the cylinder 11. The tip of the injector 16 protrudes in the cylindrical space of the cylinder 11 and injects fuel directly into the cylinder 11. The injection of fuel from the injector 16 is directed towards the cavity 12a of the piston 12. A fuel conduit 16a is connected to the end of the injector 16 and feeds pressurized fuel to the injector 16.

An engine electronic control unit (ECU) 1 to be described later controls the amount and timing of the fuel injected from the injector 16. The ECU 1 transmits a control pulse signal (injection signal) to the injector 16. Subsequently, the orifice of the injector 16 then opens for a period in accordance with the amplitude of the control pulse signal, i.e., the driving pulse width. Accordingly, the amount of injected fuel corresponds to the amplitude of the control pulse signal while the injected timing corresponds to the transmission time of the control pulse signal.

The cylinder head 15 is provided with an inlet port 17 and an outlet port 18 leading to the cylindrical space of the cylinder 11. An inlet valve 19 and an outlet valve 20 are provided to the inlet port 17 and the outlet port 18, respectively, to open and close the inlet port 17 and the outlet port 18. The inlet port 17 has an inlet passage 21 provided with an airflow sensor, an air cleaner, and a throttle valve (not illustrated) while the outlet port 18 has an outlet passage 22.

A turbocharger 23 for forcedly feeding compressed air into the cylinder 11 by an exhaust pressure is provided in an inlet and outlet system in the engine 10. The turbocharger 23, which is a forced induction device, is disposed between and connected to the inlet passage 21 and the outlet passage 22. The turbocharger 23 allows a turbine 23a to spin by the exhaust pressure in the outlet passage 22, and the torque drives a compressor (not shown) to compress the air in the inlet passage 21, thereby feeding the compressed air to the engine 10.

A catalyst unit 30 for cleaning exhaust is disposed downstream of the turbine 23a of the turbocharger 23 in the outlet passage 22. In the catalyst unit 30, an oxidation catalyst 31 shaped into a column or prism is fixed with a support (not shown) onto the inner circumference of the cylindrical casing.

According to the present embodiment, the oxidation catalyst 31 has a columnar shape through which exhaust flows in the direction of the axis of the column, that is, from the top to the bottom in FIG. 1. Alternatively, a filter for trapping particles in the exhaust to eliminate them or a NOx trap catalyst for eliminating nitrogen oxides (NOx) in the exhaust (both not shown) may be disposed downstream of the oxidation catalyst 31 in the exhaust passage.

An upstream temperature sensor 24a for detecting the temperature of the exhaust right before entering the oxidation catalyst 31 and an upstream oxygen concentration sensor 25a for detecting the oxygen concentration are disposed immediately upstream of the oxidation catalyst 31. A downstream temperature sensor 24b for detecting the temperature of the exhaust right after coming out from the oxidation catalyst 31, and a downstream oxygen concentration sensor 25b for detecting the oxygen concentration are disposed immediately downstream of the oxidation catalyst 31.

The exhaust temperature detected at the upstream temperature sensor 24a is referred to as an entrance temperature $T_{IN}$ whereas the exhaust temperature detected at the downstream temperature sensor 24b is referred to as an exit temperature $T_{OUT}$. The oxygen concentration detected at the upstream oxygen concentration sensor 25a is referred to as an entrance concentration $C_{IN}$ whereas the oxygen concentration detected at the downstream oxygen concentration sensor 25b is referred to as exit concentration $C_{OUT}$. The detected $T_{IN}$, $T_{OUT}$, $C_{IN}$, and $C_{OUT}$ are sent to the ECU 1.

A rotation speed sensor 26 for detecting an engine rotation speed Ne is provided in the vicinity of the crankshaft 14 of the engine 10. A vehicle speed sensor 27 for detecting a vehicle speed V and an accelerator pedal position sensor (APS) 28 for detecting an accelerator pedal position $\theta_{APS}$ that corresponds to the displacement of an accelerator pedal are disposed at given positions of a vehicle. The engine rotation speed Ne, the vehicle speed V, and the accelerator pedal position $\theta_{APS}$ respectively detected at the rotation speed sensor 26, the vehicle speed sensor 27, and the APS 28 are used for estimating the driving conditions of the engine 10 and are transmitted to the ECU 1.

A monitor 29 functioning as an output unit of the ECU 1 is disposed in the vicinity of the driver seat in the vehicle. The monitor 29 is controlled by a notification control unit 4 provided in the ECU 1, which will be described later, and displays the results of the determination if the results of determination of deterioration in the oxidation catalyst 31 need to be notified. The monitor 29 can be disposed anywhere a driver can see in the vehicle. For example, the monitor 29 may be shared with a GPS device.

[1-2. Oxidation catalyst]

The oxidation catalyst 31 is a Diesel Oxidation Catalyst (DOC) that oxidizes components in exhaust (exhaust components). A catalytic substance is supported in a honeycomb structure (support) composed of metal or ceramic. Precious metals such as platinum (Pt), palladium (Pd), rhodium (Rh) that oxidize components in exhausts are used as a catalytic substance in this embodiment. Examples of the components in exhaust to be oxidized by the oxidation catalyst 31 are nitrogen monoxide (NO), hydrocarbons (HCs), and carbon monoxide (CO). NO is oxidized by the oxidation catalyst 31 into nitrogen dioxide ($NO_2$).

The oxidation catalyst 31 in the catalyst unit 30 is an adsorptive oxidation catalyst composed of a HC-adsorption substance that is supported by the support and that can adsorb and desorb HCs in exhaust in addition to the aforementioned catalytic substance. Examples of the HC-adsorption substance are porous solids of, for example, zeolite, alumina, and palladium. Zeolite having a high HC adsorption rate is supported in this embodiment.

Figure 2A:
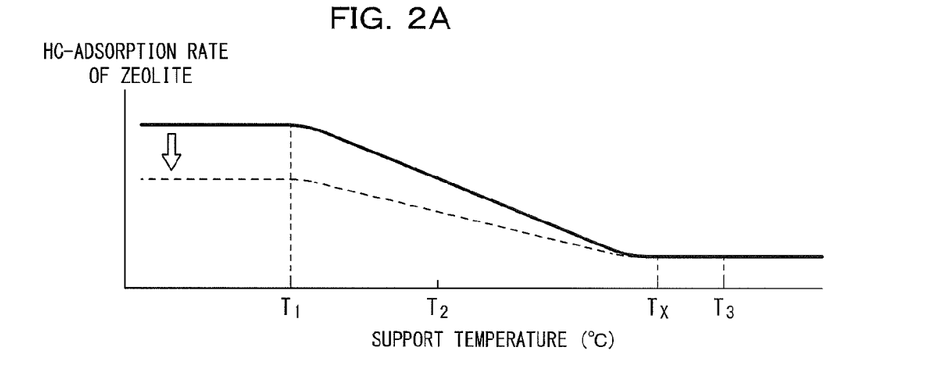
FIG. 2A shows a graph of the HC-adsorption rate of zeolite versus the temperature of an oxygen catalyst to be subjected to the determination of deterioration with the catalyst determining device.
Figure 2B:
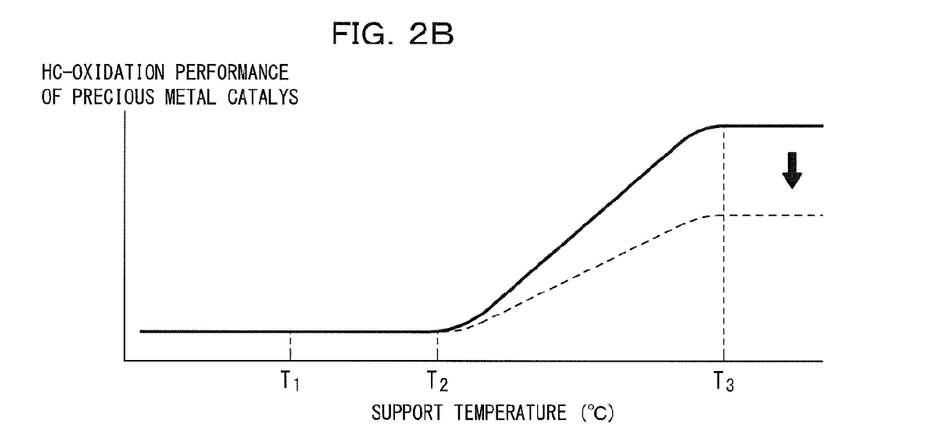
FIG. 2B shows a graph of the HC-oxidation performance of a catalytic substance versus the temperature of the oxygen catalyst.
Figure 2C:
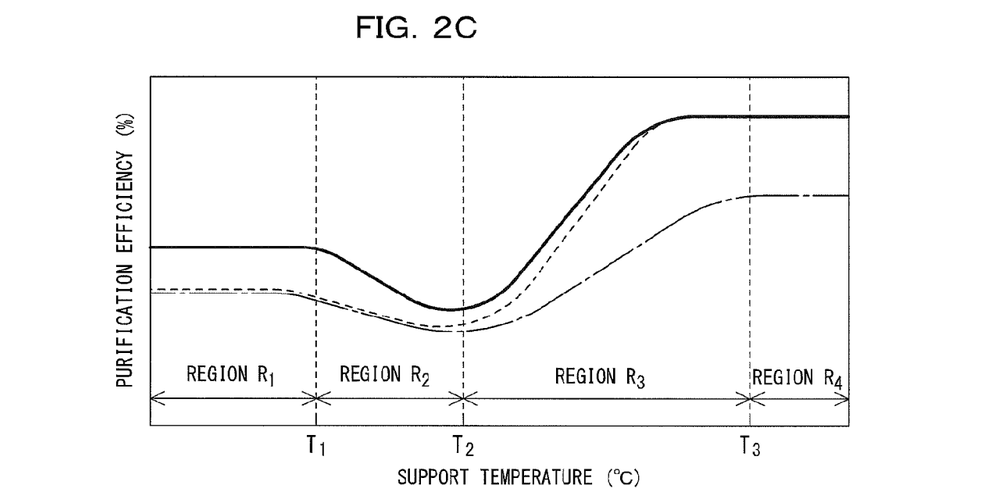
FIG. 2C shows a graph of the purifying efficiency versus the temperature of the oxygen catalyst obtained by FIGS. 2A and 2B.

FIGS. 2A to 2C are graphs each showing a relationship between the support temperature T (temperature of catalyst) and performances when the oxidation catalyst 31 is heated from a low temperature. FIG. 2A is a graph showing variations in the HC-adsorption rate of zeolite with respect to the support temperature. The solid line represents a state of normal zeolite whereas the broken line represents state of deteriorated zeolite. FIG. 2A demonstrates that zeolite adsorbs a large number of HCs in exhaust at a low support temperature T. As the temperature increases, adsorption of HCs decreases and adsorbed HCs are desorbed.

Within a temperature range ($T<T_1$) from a low support temperature T to a first prescribed temperature $T_1$, the adsorption of HCs is exclusively performed at the highest HC-adsorption rate. The temperature range ($T<T_1$) will be referred to as a first region $R_1$ hereinafter. Zeolite desorbs adsorbed HCs in addition to adsorption of HCs at a support temperature T higher than the first prescribed temperature $T_1$. The first prescribed temperature $T_1$ is a temperature at which HCs begin to desorb from zeolite. When the support temperature T reaches a certain temperature $T_x$, zeolite desorbs the adsorbed HCs without further adsorption of HCs.

In other words, at a support temperature T within the temperature range ($T_1 \le T<T_x$) greater than or equal to the first prescribed temperature $T_1$ and lower than the temperature Tx, the HC-adsorption rate of zeolite gradually decreases (the curve declines as the support temperature T increases). At a support temperature T greater than or equal to the temperature $T_x$ ($T_x \le T$), the HC-adsorption rate is lowest. The temperature $T_x$ is substantially equal to or slightly lower than a third prescribed temperature $T_3$, which will be described later. Although FIG. 2A shows the temperature $T_x$ slightly lower than the third prescribed temperature $T_3$, the following description is based on the assumption that the temperature $T_x$ is equal to the third prescribed temperature $T_3$.

With regard to zeolite having such characteristics, progress of deterioration causes the HC-adsorption rate to decrease. As shown in FIG. 2A, at the same support temperature T, deteriorated zeolite indicated by the broken line adsorbs less HCs than normal zeolite indicated by the solid line does. As indicated by the white arrow in FIG. 2A, at the support temperature T below the first prescribed temperature $T_1$, that is, within the first region $R_1$, the difference in the HC-adsorption rate is noticeable.

FIG. 2B is a graph showing variations in HC-oxidation performance of a precious metal catalyst with respect to the support temperature T of the oxidation catalyst 31. The solid line represents a state of a normal precious metal catalyst whereas the broken line represents a deteriorated precious metal catalyst. As shown in FIG. 2B, at a low support temperature T, the precious metal catalyst cannot oxidize (combust) HCs in the exhaust. As the support temperature T increases to a certain level, the precious metal catalyst initiates the combustion of HCs. As the temperature increases, larger amounts of HCs are combusted.

More specifically, within the temperature range ($T<T_2$) from the low support temperature T to the second prescribed temperature $T_2$, the precious metal catalyst cannot exhibit oxidation performance, that is, HCs cannot be oxidized (combusted), and thus the HC-oxidation performance of the precious metal catalyst is lowest. At a support temperature T greater than or equal to the second prescribed temperature $T_2$ ($T_2 \leq T$), the precious metal catalyst is activated to gradually oxidize HCs, and thus the HC-oxidation performance of the precious metal catalyst gradually increases (the curve rises as the support temperature T increases).

At a support temperature T greater than or equal to the third prescribed temperature $T_3$ ($T_3 \leq T$), the precious metal catalyst is well activated to combust a large number of HCs in exhaust and thus the HC-oxidation performance is maximized in this temperature range. At the second prescribed temperature $T_2$, the precious metal catalyst, which is supported by the oxidation catalyst 31, begins oxidizing HCs whereas at the third prescribed temperature $T_3$, oxidation by the precious metal catalyst is saturated. The temperature range ($T_3 \leq T$) greater than or equal to the third prescribed temperature $T_3$ is referred to a fourth region $R_4$.

With the precious metal catalyst having such characteristics, as the deterioration proceeds, the HC-oxidation performance decreases. Namely, as shown in FIG. 2B, at the same support temperature T, the deteriorated precious metal catalyst indicated by the broken line oxidizes less HC than the normal precious metal catalyst indicated by the solid line does. As indicated by the black arrow in FIG. 2B, when the support temperature T is greater than or equal to the third prescribed temperature $T_3$, that is, in the fourth region $R_4$, a decrease in oxidation is significantly apparent.

FIG. 2C is a graph showing a purifying efficiency versus the support temperature T of the oxidation catalyst 31 obtained by FIGS. 2A and 2B. The solid line represents a normal state indicating zeolite and the precious metal catalyst before deterioration, the broken line represents a state indicating deterioration of zeolite only, and the dotted-dashed line represents deterioration of both zeolite and the precious metal catalyst. Namely, the solid line in FIG. 2C is a combination of the solid lines in FIGS. 2A and 2B. The broken line in FIG. 2C is a combination of the broken line in FIG. 2A and the solid line in FIG. 2B. The dotted-dashed line in FIG. 2C is a combination of the broken lines in FIGS. 2A and 2B.

As shown in FIGS. 2A to 2C, zeolite works whereas the precious metal catalyst does not work in the first region $R_1$, so that zeolite adsorbs HCs in exhaust to purify the exhaust. That is, the purifying efficiency in the region $R_1$ corresponds to the HC-adsorption rate of zeolite in FIG. 2A. With respect to the purifying efficiency shown in FIG. 2C in the first region $R_1$, the broken line and the dotted-dashed line that represent a state where zeolite deteriorates is lower than the solid line that represents a state where zeolite does not deteriorate.

At a support temperature T greater than or equal to the first prescribed temperature $T_1$ and lower than the second prescribed temperature $T_2$ ($T_1 \leq T<T_2$), oxidation of HCs by the precious metal catalyst does not start; hence, the purifying efficiency of the oxidation catalyst 31 corresponds to the HC-adsorption rate of zeolite within this temperature range. Accordingly, as the HC-adsorption rate of zeolite decreases, the purifying efficiency decreases within this temperature range. The purifying efficiencies of the broken line and the dotted-dashed line, which represent a state of deteriorated zeolite, decreases moderately as compared to that of the solid line with increasing support temperature T, that is, the curves of the broken line and dotted-dashed line decline moderately as compared to the solid line with increasing support temperature T.

This is because deteriorated zeolite does not adsorb a large number of HCs at a support temperature T lower than the first prescribed temperature $T_1$. Since the deteriorated zeolite exhibits a slight decrease in purifying efficiency due to its low purifying efficiency at a support temperature T greater than or equal to the first prescribed temperature $T_1$, the purifying efficiency does not significantly change even if the support temperature T varies. In contrast, normal zeolite exhibits a significant decrease in purifying efficiency with the increase of the support temperature T as indicated by the solid line. This temperature range ($T_1 \leq T<T_2$) is referred to as a second region $R_2$.

At a support temperature T greater than or equal to the second prescribed temperature $T_2$ and lower than the third prescribed temperature $T_3$ ($T_2 \leq T<T_3$), the HC-adsorption rate of zeolite continues to decrease and the HC-oxidation performance of the precious metal catalyst starts to increase at the second prescribed temperature $T_2$. Accordingly, within this temperature range, an increase in the HC-oxidation performance of the precious metal catalyst has a greater influence on the overall purifying efficiency of the oxidation catalyst 31 than a decrease in the HC-adsorption rate due to zeolite does.

Namely, within the temperature range ($T_2 \leq T<T_3$), the purifying efficiency of the oxidation catalyst 31 increases as the temperature increases regardless of deterioration of the zeolite and precious metal catalyst. Specifically, the solid line and broken line, which represent a normal precious metal catalyst, have a greater gradient (increase in the purifying efficiency) than the dotted-dashed line, which represents a deteriorated precious metal catalyst. Hereinafter, this temperature range ($T_2 \leq T<T_3$) is referred to as a third region $R_3$.

Since zeolite exclusively desorbs HCs but does not adsorb HCs in the fourth region $R_4$, the precious metal catalyst purifies the exhaust through oxidization (combustion) of HCs in the exhaust. That is, the purifying efficiency in the fourth region $R_4$ corresponds to the HC-oxidation performance of the precious metal catalyst in FIG. 2B. Thus, in the fourth region $R_4$ in FIG. 2C, the purifying efficiency of the deteriorated precious metal catalyst indicated by the dotted-dashed line is lower than those of the normal precious metal catalysts indicated by solid line and the dotted line.

[2. Configuration of Control System]

The ECU 1 is a computer that includes a CPU for executing various calculations, a ROM for storing program and data necessary for the control, a RAM for temporary storage of, e.g., the results of calculations at the CPU, an input/output port for inputting/outputting a signal to/from an exterior, a timer for counting a control time, for example. The upstream temperature sensor 24a, the downstream temperature sensor 24b, the upstream oxygen concentration sensor 25a, the downstream oxygen concentration sensor 25b, the rotation speed sensor 26, the vehicle speed sensor 27, and an accelerator pedal position sensor 28 are connected to the input terminals of the ECU 1.

The engine 10 and the monitor 29 are connected to the output terminals of the ECU 1. ECU 1 controls the amount of air, the amount of fuel injection to be supplied to each cylinder 11 of the engine 10, the ignition timing of each cylinder 11. ECU 1 controls display in the monitor 29. Determination of the deterioration of the oxidation catalyst 31 among various controls performed in the ECU 1 will now be described hereinafter. In the embodiment, functional elements for determining the deterioration is provided in the ECU 1 and determination of the deterioration is performed in the ECU 1.

Alternatively, the functional elements may be provided in any electronic control device in the vehicle.

The ECU 1 includes a functional element for a calculating unit 2 for preliminary calculation for the determination of deterioration of the oxidation catalyst 31, a functional element for a deterioration determining unit 3 for determining the deterioration of the oxidation catalyst 31, and a functional element for the notification control unit 4 for notifying a driver of the result of the determination obtained by the deterioration determining unit 3.

The calculating unit 2 includes a functional element for a temperature calculating unit 2a for calculating the support temperature T of the oxidation catalyst 31 and a functional element for a concentration-difference calculating unit 2b for calculating a difference $\Delta C$ in oxygen concentration between upstream and downstream of the oxidation catalyst 31.

The temperature calculating unit (temperature acquiring unit) 2a calculates the support temperature T of the oxidation catalyst 31 based on the entrance temperature $T_{IN}$ and the exit temperature $T_{OUT}$ detected respectively at the upstream temperature sensor 24a and the downstream temperature sensor 24b. The calculation is performed through the following steps: A map of the relationship between an exhaust temperature and the support temperature T of the oxidation catalyst 31 is stored in advance. The average temperature $T_{AVE}$ of the exhaust temperature is calculated from the entrance temperature $T_{IN}$ and the exit temperature $T_{OUT}$. The support temperature T is calculated from the average temperature $T_{AVE}$ and the map. The resulting support temperature T is transmitted to the deterioration determining unit 3.

The concentration-difference calculating unit 2b calculates the difference $\Delta C$ in oxygen concentration between upstream and downstream of the oxidation catalyst 31 based on the entrance concentration $C_{IN}$ and the exit concentration $C_{OUT}$, respectively, detected at the upstream oxygen concentration sensor 25a and the downstream oxygen concentration sensor 25b. The difference $\Delta C$ in oxygen concentration is calculated by the following equation (1) in the embodiment:

$$\Delta C = C_{IN} - C_{OUT} \qquad (1)$$

The resulting difference $\Delta C$ in oxygen concentration is transmitted to the deterioration determining unit 3.

The deterioration determining unit (determination unit) 3 determines deterioration of the oxidation catalyst 31. The deterioration determining unit 3 includes a functional element for a provisional determination unit 3a for provisionally determining the deterioration of zeolite supported by the oxidation catalyst 31, a functional element for a first determination unit 3b for determining the deterioration of zeolite, and a functional element for a second determination unit 3c for determining the deterioration of the precious metal catalyst.

At a support temperature T residing in the first region $R_1$ ($T<T_1$), the provisional determination unit 3a provisionally determines the deterioration prior to the determination of deterioration by the first determination unit 3b. Specifically, at a support temperature T residing in the first region $R_1$, the provisional determination unit 3a acquires the difference $\Delta C$ in oxygen concentration at this support temperature T, and compares the difference $\Delta C$ in oxygen concentration to a first prescribed value $C_1$. The provisional determination unit 3a provisionally determines that zeolite is normal (does not deteriorate) if the difference $\Delta C$ in oxygen concentration is greater than or equal to the first prescribed value $C_1$. On the other hand, the provisional determination unit 3a provisionally determines that zeolite might deteriorate if the difference $\Delta C$ in oxygen concentration is lower than the first prescribed value $C_1$.

Described below is a reason for the usage of the difference $\Delta C$ in oxygen concentration for the provisional determination of the deterioration of zeolite. Zeolite supported by the oxidation catalyst 31 exhibits a decreased HC-adsorption rate with its own deterioration. That is, as zeolite deteriorates, the residual HC content does not decrease so much in the exhaust downstream of the oxidation catalyst 31. Thus, as zeolite deteriorates, the difference in the oxygen concentration between upstream and downstream of the oxidation catalyst 31, i.e., the difference $\Delta C$ in oxygen concentration becomes relatively small. Consequently, the deterioration of zeolite is provisionally determined through comparison of the difference $\Delta C$ in oxygen concentration with a given threshold, that is, the first prescribed value $C_1$.

The observation of a change in HC content by the difference $\Delta C$ in oxygen concentration between upstream and downstream of the oxidation catalyst 31 may also be applied to the determination of deterioration of zeolite and the determination of deterioration of the precious metal catalyst, which will be described later, in addition to the provisional determination of deterioration of zeolite. As the zeolite and the precious metal catalyst supported by the oxidation catalyst 31 deteriorate, the HC-adsorption rate in the exhaust and HC-oxidation performance decrease. Accordingly, as the zeolite and precious metal catalyst deteriorate, the difference $\Delta C$ in oxygen concentration becomes relatively small.

That is, the difference $\Delta C$ in oxygen concentration between upstream and downstream of the oxidation catalyst 31 can be applied to the determination of deterioration of the oxidation catalyst 31. The purifying efficiency on the ordinate in FIG. 2C corresponds to the difference $\Delta C$ in oxygen concentration. The graph elucidates that a high purifying efficiency of the oxidation catalyst 31 indicates effective removal of HCs in the exhaust. A large number of decreased HCs corresponds to a relatively high difference $\Delta C$ in oxygen concentration in the exhaust.

If a large amount of HCs are already adsorbed to zeolite in the provisional determination of deterioration of zeolite, the HC-adsorption rate decreases regardless of the deterioration of zeolite (even though zeolite does not deteriorate). At a support temperature T within the first region $R_1$, the difference $\Delta C$ in oxygen concentration and the first prescribed value $C_1$ are compared. If the difference $\Delta C$ in oxygen concentration is below the first prescribed value $C_1$, the provisional determination unit 3a provisionally determines possible deterioration of zeolite. The results of determination of the provisional determination unit 3a are transmitted to the first determination unit 3b.

The first determination unit 3b determines true deterioration of zeolite at a support temperature T residing in the second region $R_2$ ($T_1 \leq T < T_2$). Specifically, the first determination unit 3b acquires the two differences $\Delta C$ in oxygen concentration at two different support temperatures T of the oxidation catalyst 31 from the concentration-difference calculating unit 2b at the support temperatures T in the second region $R_2$, and compares the difference dC between the two differences $\Delta C$ in oxygen concentration with a second prescribed value (prescribed value) $C_2$. If the difference dC between the two differences $\Delta C$ in oxygen concentration is greater than or equal to the second prescribed value $C_2$, the first determination unit 3b determines that zeolite is normal (does not deteriorate). If the difference dC is lower than the second prescribed value $C_2$, the first determination unit 3b determines that zeolite deteriorates.

As described above, at a support temperature T in the second region $R_2$, the decrease in the purifying efficiency (the decrease in the difference $\Delta C$ in oxygen concentration) with an increase in temperature becomes small as zeolite deteriorates. That is, when zeolite is normal, the decrease in the purifying efficiency is noticeable. Since deteriorated zeolite has a small decrease in the purifying efficiency, the decrease in the purifying efficiency is compared to a certain threshold (the second prescribed value $C_2$). If the decrease is smaller than the second prescribed value $C_2$, the first determination unit $3b$ determines that zeolite deteriorates.

The first determination unit $3b$, which receives from the provisional determination unit $3a$, the result of determination of possible deterioration of zeolite, changes (revises) the second prescribed value $C_2$ serving as a threshold for determination of deterioration of zeolite to a revised second prescribed value $C_2'$. Here, if the provisional determination of deterioration determines possible deterioration, the revised second prescribed value $C_2'$ is set larger than the second prescribed value $C_2$ ($C_2 < C_2'$). In this way, even relatively low deterioration can be included in the determination "deterioration". This allows the criteria for determination at the first determination unit $3b$ to be more critical, which improves the accuracy of determination. The results of the determination of the first determination unit $3b$ are transmitted to the notification control unit 4.

The second determination unit $3c$ determines deterioration of the precious metal catalyst at a support temperature T residing in a fourth region $R_4$ ($T_3 \leq T$). Specifically, the second determination unit $3c$ acquires the difference $\Delta C$ in oxygen concentration at the support temperature T in the fourth region $R_4$ and compares the difference $\Delta C$ in oxygen concentration with a third prescribed value $C_3$. The second determination unit $3c$ determines that the precious metal catalyst is normal (does not deteriorate) at a difference $\Delta C$ in oxygen concentration greater than or equal to the third prescribed value $C_3$. The second determination unit $3c$ determines that the precious metal catalyst deteriorates at a difference $\Delta C$ in oxygen concentration lower than the third prescribed value $C_3$.

As described above, the purifying efficiency (difference $\Delta C$ in oxygen concentration) in the fourth region $R_4$ depends on the state of the precious metal catalyst. That is, the normal precious metal catalyst exhibits a high purifying efficiency whereas a deteriorated precious metal catalyst exhibits low purifying efficiency. The second determination unit $3c$ compares the difference $\Delta C$ in oxygen concentration at the support temperature T in the fourth region $R_4$ with a certain threshold (a third prescribed value $C_3$). If the difference $\Delta C$ in oxygen concentration is smaller than the third prescribed value $C_3$, deterioration of the precious metal catalyst is determined. The results of the determination of the second determination unit $3c$ are transmitted to the notification control unit 4.

The reason why the second determination unit $3c$ does not perform determination of deterioration of the precious metal catalyst in the third region $R_3$ ($T_2 \leq T < T_3$) is as follows: Since the HC-adsorption rate of zeolite and the HC-oxidation performance of the precious metal catalyst vary separately in the third region $R_3$, it is difficult to determine whether zeolite or the precious metal catalyst deteriorates from the difference $\Delta C$ in oxygen concentration like the first, second, and fourth regions $R_1$, $R_2$, and $R_4$.

Examples of the condition for terminating the determination of deterioration by the second determination unit $3c$ (termination condition) are as follows: The support temperature T reaches a prescribed temperature higher than the third prescribed temperature $T_3$, or a prescribed number of the deterioration operation of determination are performed.

The notification control unit 4 receives the results of determination from the first determination unit $3b$ and the second determination unit $3c$ and determines the need of notification of the results of determination to the driver. If the notification control unit 4 determines the notification of the results, the results are displayed on the monitor 29. If the first determination unit $3b$ determines the deterioration of zeolite, or if the second determination unit $3c$ determines the deterioration of the precious metal catalyst respectively, the notification control unit 4 determines the notification of the results.

[3. Flowchart]

Figure 3:
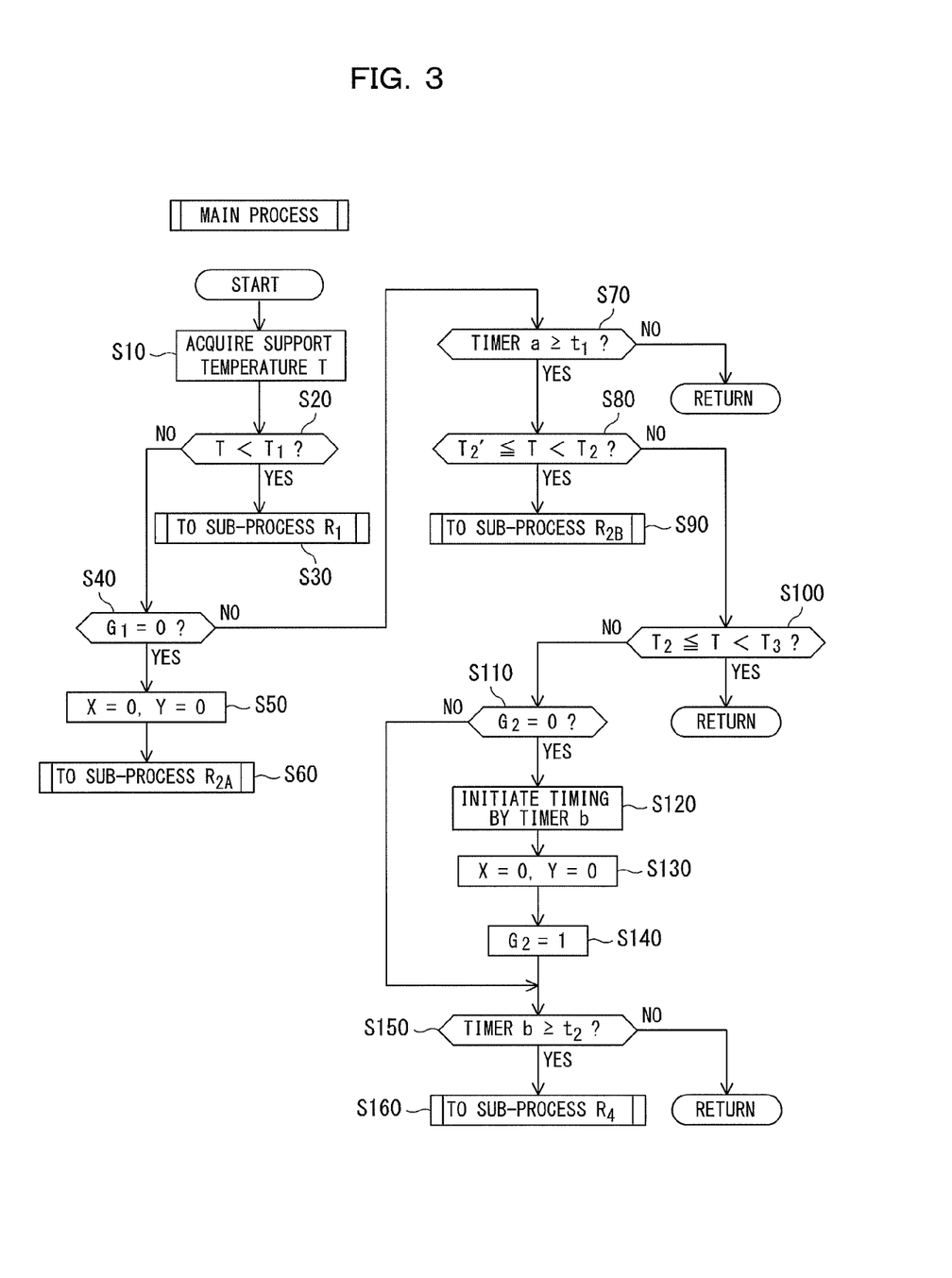
FIG. 3 is a flowchart of the main process of the determination of deterioration performed with the catalyst determining device.
Figure 4:
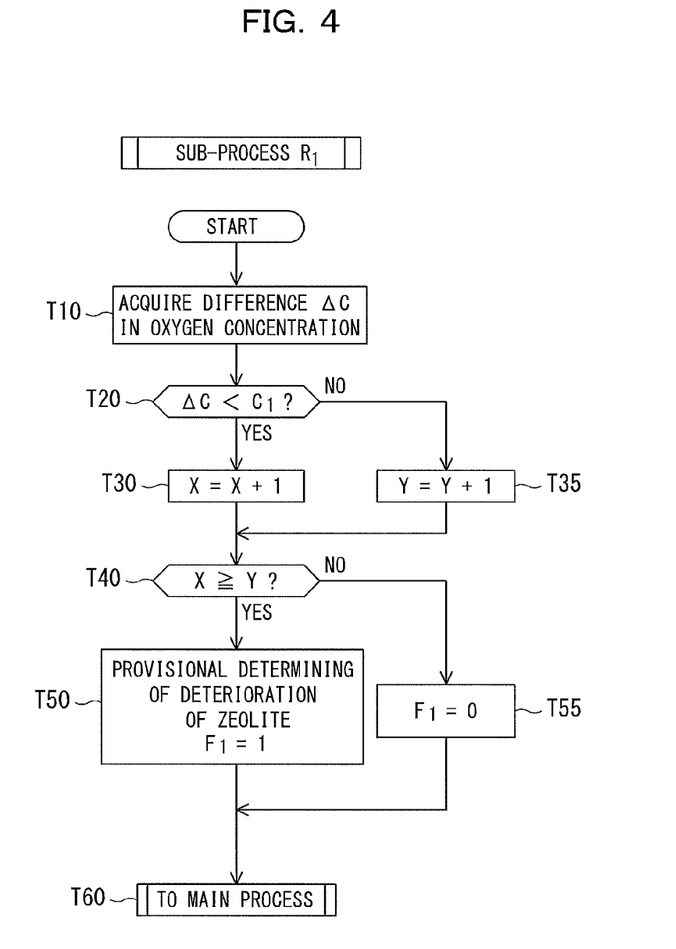
FIG. 4 is a flowchart of a sub-process $R_1$ of the main process in FIG. 3, showing provisional determination of deterioration.
Figure 5A:
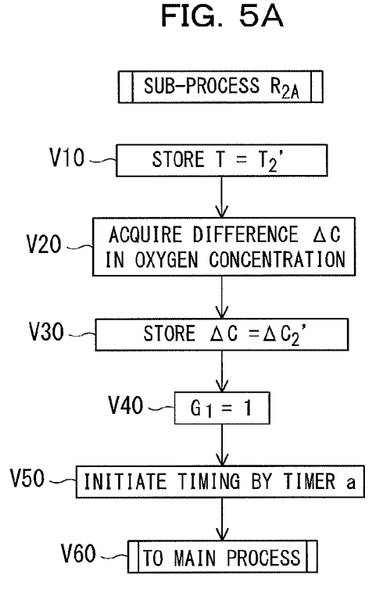
FIG. 5A is a flowchart of a sub-process $R_{2A}$ of the main process in FIG. 3, showing the determination of the deterioration of zeolite in the oxidation catalyst.
Figure 5B:
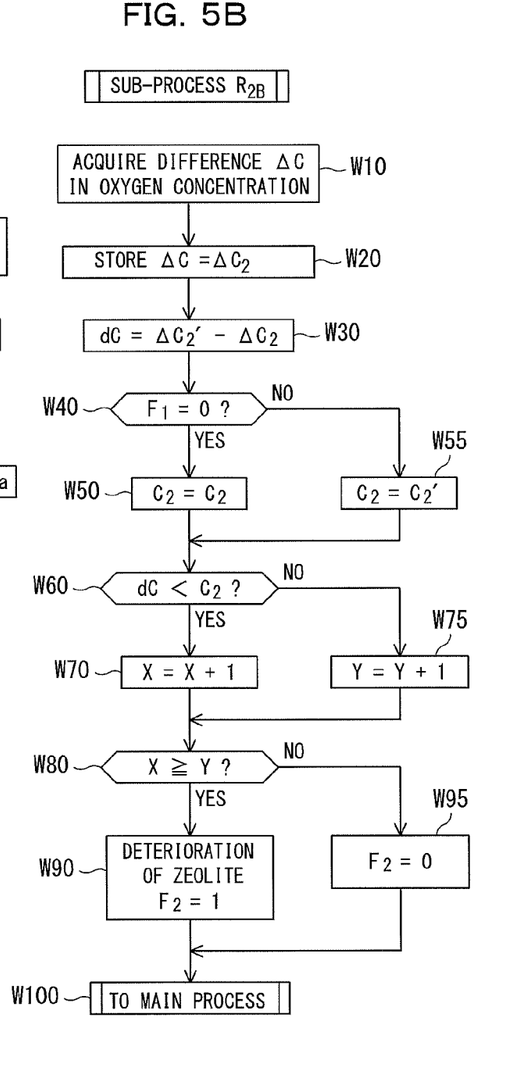
FIG. 5B is a flowchart of a sub-process $R_{2B}$ of the main process in FIG. 3, showing the determination of the deterioration of zeolite in the oxidation catalyst.
Figure 6:
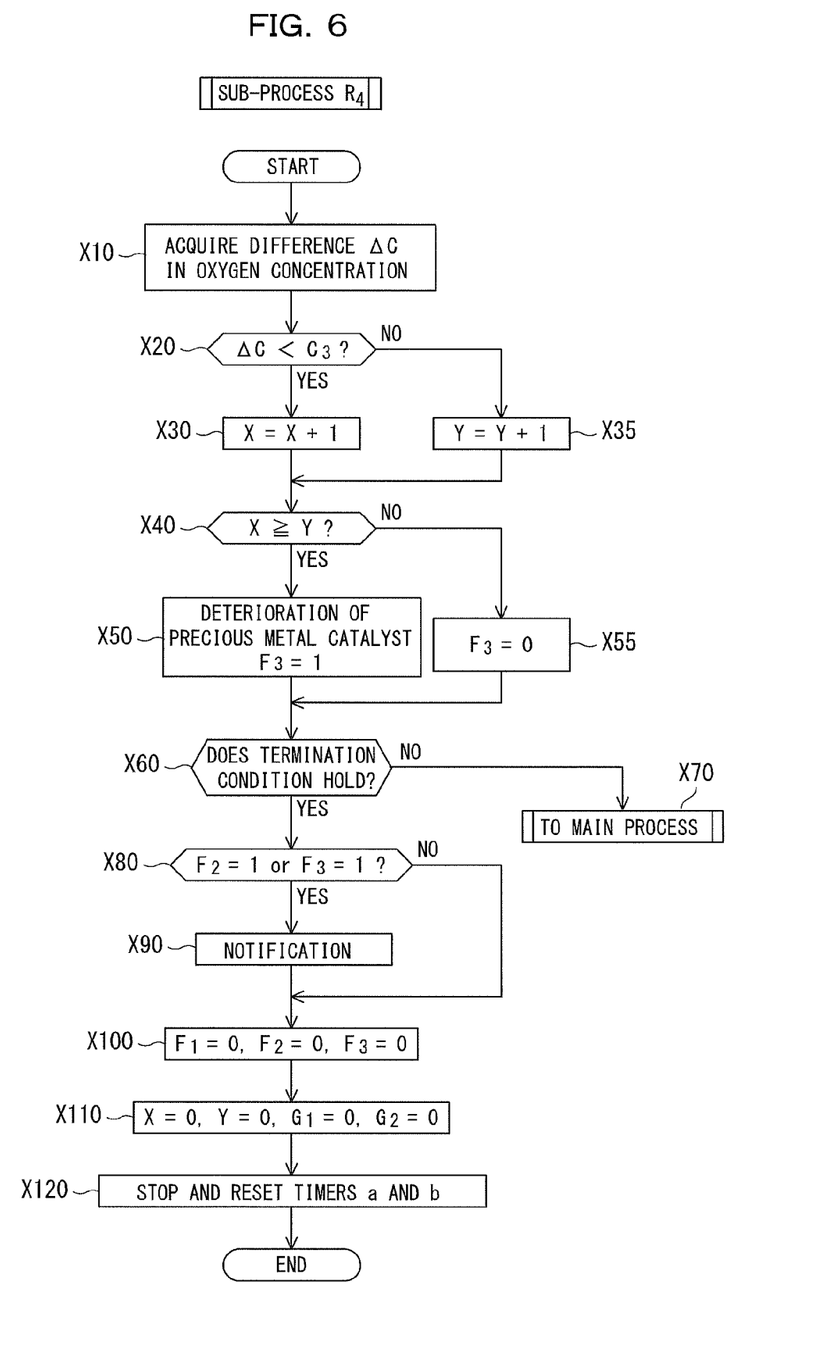
FIG. 6 is a flowchart of a sub-process $R_4$ of the main process in FIG. 3, showing the determination of the deterioration of a precious metal catalyst in the oxidation catalyst.

With reference to FIGS. 3 to 6, an exemplary determination process of deterioration executed at the ECU 1 will now be described hereinafter. FIG. 3 is a main process flowchart that is broken into sub-process flowcharts in accordance with the support temperature T of the oxidation catalyst 31. FIGS. 4 to 6 are sub-process flowcharts of the main process flowchart in FIG. 3. A series of processes shown in the flowcharts are repeated in a predetermined cycle.

[3-1. First Region $R_1$]

The main process shown in FIG. 3 is executed when the engine 10 is started. Specifically, when it is a cold start, the deterioration of zeolite can be determined.

The temperature calculating unit $2a$ calculates the support temperature T of the oxidation catalyst 31 in Step S10. The deterioration determining unit 3 determines whether the support temperature T is lower than a first prescribed temperature $T_1$ in Step S20. This step determines whether the support temperature T is within the first region $R_1$. If the support temperature T is lower than the first prescribed temperature $T_1$, the process proceeds to a sub-process $R_1$ in Step S30 in FIG. 4.

FIG. 4 shows an exemplary sub-process $R_1$ for the provisional determination of deterioration executed at a support temperature T within the first region $R_1$. In Step T10, the concentration-difference calculating unit $2b$ calculates the difference $\Delta C$ in oxygen concentration at the support temperature T acquired in Step S10. The provisional determination unit $3a$ determines whether the resulting difference $\Delta C$ in oxygen concentration is smaller than the first prescribed value $C_1$ in Step T20. The provisional determination unit $3a$ also determines possible deterioration of zeolite supported by the oxidation catalyst 31 in Step T20.

If the difference $\Delta C$ in oxygen concentration is smaller than the first prescribed value $C_1$, the process proceeds to Step T30. If the difference $\Delta C$ in oxygen concentration is greater than or equal to a first prescribed value $C_1$, the process proceeds to Step T35. In Step T30, the cycles of the process proceeding from Step T20 to a YES route are counted into a count X. In Step T35, the cycles of the process proceeding from Step T20 to a NO route are counted into a count Y. Step T40 determines whether the count X in Step T30 is greater than or equal to the count Y in Step T35.

The Steps T30, T35, and T40 will now be described. If the support temperature T is lower than the first prescribed temperature $T_1$, the sub-process $R_1$ is repeated, and the determination in Step T20 is performed every time. Consequently, if the number of determinations of possible deterioration of zeolite (YES route in Step T20) is greater than or equal to the number of determinations on normal zeolite (NO route in Step T20), possible deterioration of zeolite is determined in Steps T30, T35, and T40.

If Step T40 determines the count X is greater than or equal to the count Y (X≥Y), the provisional determination unit $3a$ determines provisional deterioration of zeolite, and "1" is assigned to a flag $F_1$ ($F_1$=1) in Step T50. If Step T40 determines the count X is smaller than the count Y (X<Y), the provisional determination unit 3a determines normal zeolite, and "0" is assigned to a flag $F_1$ ($F_1=0$) in Step T55. That is, the flag $F_1$ is a variable to check the possibility of deterioration of zeolite. Once the flag $F_1$ is assigned in Step T50 and Step T55, the process returns to the main process in Step T60. The sub-process $R_1$ is repeated until the support temperature T becomes greater than or equal to the first prescribed temperature $T_1$.

[3-2. Second Region $R_2$]

In the main process in FIG. 3, if the support temperature T becomes more than or equal to the first prescribed temperature $T_1$, the process proceeds from Step S20 to Step S40 through a NO route. Step S40 determines whether a flag $G_1$ is "0" ($G_1=0$). The flag $G_1$ is a variable to check completion of a sub-process $R_{2A}$. A flag $G_1$ of "0" indicates incompletion of the sub-process $R_{2A}$, whereas a flag $G_1$ of "1" indicates completion of the sub-process $R_{2A}$. When the process proceeds to Step S40 for the first time after the main process started, the flag $G_1$ is assigned to "0" ($G_1=0$), and the process proceeds to Step S50. In Step S50, the counts X and Y (variables) used in the sub-process $R_1$ are reset to zero, and the process proceeds to the sub-process $R_{2A}$ in Step S60.

The sub-process $R_{2A}$ in FIG. 5A and a sub-process $R_{2B}$ in FIG. 5B are exemplary determinations of deterioration of zeolite executed at a support temperature T within the second region $R_2$. As shown in FIG. 5A, the support temperature T obtained in Step S10 in this cycle is stored as a first temperature $T_2'$ in Step V10. In subsequent Step V20, the difference $\Delta C$ in oxygen concentration is acquired at a support temperature T being the first temperature $T_2'$. In Step V30, the difference $\Delta C$ in oxygen concentration acquired in Step V20 is stored as a first difference $\Delta C_2'$ in oxygen concentration. Subsequently, in Step V40, "1" is assigned to the flag $G_1$ ($G_1=1$) and in Step V50, a timer "a" initiates counting. The process returns to the main process in Step V60.

In Step S40 in the main process, since the flag $G_1$ is assigned to "1" ($G_1=1$) in Step V40 of the preceding cycle, the process proceeds to Step S70 through a NO route. Namely, the sub-process $R_{2A}$ is executed only once at a flag $G_1$ of "0" ($G_1=0$). Step S70 determines whether the duration of time obtained by the timer "a" is greater than or equal to a predetermined time $t_1$. Until the duration of time obtained by the timer "a" becomes equal to or higher than the predetermined time $t_1$, Steps S10, S20, S40, and S70 in the main process are repeated.

When the duration of time obtained by the timer "a" becomes greater than or equal to the predetermined time $t_1$, the deterioration determining unit 3 determines whether the support temperature T is greater than or equal to the first temperature $T_2'$ stored in Step V10 in the sub-process $R_{2A}$ and also lower than a second prescribed temperature $T_2$ in Step S80. This step determines whether the support temperature T is within the second region $R_2$. If the support temperature T is within the second region $R_2$, the process proceeds to a sub-process $R_{2B}$ in FIG. 5B in Step S90. The prescribed time $t_1$ is preset to a time shorter than the time at which the support temperature T of the oxidation catalyst 31 reaches the second prescribed temperature $T_2$ at the cold start of the engine 10.

As shown in FIG. 5B, the difference $\Delta C$ in oxygen concentration is acquired at a support temperature T (second temperature) acquired in Step S10 in this cycle in Step W10. In Step W20, this difference $\Delta C$ in oxygen concentration is stored as a second difference $\Delta C_2$ in oxygen concentration. In subsequent Step W30, the second difference $\Delta C_2$ in oxygen concentration stored in previous Step W20 is subtracted from the difference $\Delta C_2'$ in oxygen concentration stored in Step V30 to obtain a difference dC in the difference $\Delta C$ in oxygen concentration at different support temperatures T of the oxidation catalyst 31.

Step W40 checks the flag $F_1$ for determination on possible deterioration of zeolite in the sub-process $R_1$. If the zeolite is determined to be normal (flag $F_1=0$), the second prescribed value $C_2$ is not varied in Step W50. If the zeolite is determined to be possibly deteriorated (flag $F_1=1$), the second prescribed value $C_2$ is set to a revised second prescribed value $C_2'$ in Step W55.

In Step W60, the first determination unit 3b determines whether the difference dC calculated in Step W30 is smaller than the second prescribed value $C_2$ set in Step W50 or Step W55. Step W60 determines whether zeolite truly deteriorates. If the difference dC is smaller than the second prescribed value $C_2$, the process proceeds to Step W70. If the difference dC is greater than or equal to the second prescribed value $C_2$, the process proceeds to Step W75. In Step W70, the cycles of process proceeding to Step W70 through a YES route from Step W60 are counted into a count X, whereas the cycles of the process proceeding to Step W75 through a NO route from Step W60 are counted into a count Y in Step W75. Step W80 determines whether the count X in Step W70 is more than or equal to the count Y in Step W75. The Steps W70, W75, and W80 are the same as Steps T30, T35, and T40 in the sub-process $R_1$, and thus their description is omitted here.

If the count X is more than or equal to the count Y ($X \geq Y$) in Step W80, the first determination unit 3b determines the deterioration of zeolite, and "1" is assigned to the flag $F_2$ ($F_2=1$) in Step W90. If the count X is smaller than the count Y ($X<Y$) in Step W80, the first determination unit 3b determines that zeolite is normal, and "0" is assigned to the flag $F_2$ ($F_2=0$) in Step W95. That is, the flag $F_2$ is a variable to check the deterioration of zeolite. After the flag $F_2$ is set in Step W90 or Step W95, the process returns to the main process in Step W100. The sub-process $R_{2B}$ is repeated until the support temperature T becomes greater than or equal to the second prescribed temperature $T_2$.

[3-3. Third region $R_3$]

In the main process in FIG. 3, if the support temperature T is greater than or equal to the second prescribed temperature $T_2$, the process proceeds from Step S80 to Step S100 through a NO route. The deterioration determining unit 3 determines whether the support temperature T is greater than or equal to the second prescribed temperature $T_2$ and also lower than the third prescribed temperature $T_3$ in Step S100. This step determines whether the support temperature T is within the third region $R_3$. If the support temperature T is within the third region $R_3$, the deterioration of the oxidation catalyst 31 cannot be determined; therefore, the process returns to the beginning of the main process. Steps S10, S20, S40, S70, S80 and S100 in the main process are repeated until the support temperature T becomes greater than or equal to the third prescribed temperature $T_3$.

[3-4. Fourth Region $R_4$]

In the main process in FIG. 3, if the support temperature T is greater than or equal to the third prescribed temperature $T_3$, Step S100 determines whether the flag $G_2$ is "0" ($G_2=0$). The flag $G_2$ is a variable to check if time obtained by a timer "b" exceeds a predetermined time $t_2$. When "0" is assigned to the flag $G_2$ ($G_2=0$), the time does not exceed the predetermined time $t_2$. When "1" is assigned to the flag $G_2$ ($G_2=1$), the time exceeds the predetermined time $t_2$. When the process proceeds to Step S110 for the first time after the main process is executed, "0" is assigned to the flag $G_2$ ($G_2=0$). In subsequent Step S120, the timer "b" initiates the timing. In Step S130, the counts (variables) X and Y used in the sub-process $R_{2B}$ are reset to be zero. Subsequently, "1" is assigned to the flag $G_2$ ($G_2$=1) in Step S140.

Step S150 determines whether the time obtained by the timer "b" exceeds the predetermined time $t_2$. If the predetermined time $t_2$ is smaller than the time obtained by the timer "b", the process returns to the beginning of the main process. In the next cycle, the process proceeds to a NO route in Step S110. Steps S10, S20, S40, S70, S80, S100, S110, and S150 are repeated until the process proceeds to a YES route in Step S150. The pre-set prescribed time $t_2$ is a waiting time for raising the support temperature T and stabilizing the purifying efficiency at a certain level.

If the time obtained by the timer "b" exceeds the predetermined time $t_2$, in Step S160 the process proceeds from a YES route in Step S150 to a sub-process $R_4$ in FIG. 6. FIG. 6 shows the sub-process $R_4$ that is an exemplary determination of deterioration of the precious metal catalyst executed when the support temperature T is within the fourth region $R_4$. As shown in FIG. 6, the difference $\Delta C$ in oxygen concentration at the support temperature T obtained in Step S10 in this cycle is obtained in Step X10. The second determination unit 3c determines whether this difference $\Delta C$ in oxygen concentration is smaller than the third prescribed value $C_3$ in subsequent Step X20. Step X20 determines deterioration of the precious metal catalyst supported by the oxidation catalyst 31.

If the difference $\Delta C$ in oxygen concentration is smaller than the third prescribed value $C_3$, the process proceeds to Step X30. If the difference $\Delta C$ in oxygen concentration is greater than or equal to the third prescribed value $C_3$, the process proceeds to Step X35. In Step X30, the cycles of the process proceeding to a YES route from Step X20 are counted into a count X. In Step X35, the cycles of the process proceeding to a NO route from Step X20 are counted into a count Y. Step X40 determines whether the count X in Step X30 is greater than or equal to the count Y in Step X35. The Steps X30, X35, and X40 are the same processes as those in Steps T30, T35, and T40 in the sub-process $R_1$.

If the count X is greater than or equal to the count Y (X≥Y) in Step X40, the second determination unit 3c determines the deterioration of the precious metal catalyst, and "1" is assigned to a flag $F_3$ ($F_3$=1) in Step X50. If the count X is smaller than count Y (X<Y) in Step X40, the second determination unit 3c determines that the precious metal catalyst is normal, and "0" is assigned to the flag $F_3$ ($F_3$=0) in Step X55. That is, the flag $F_3$ is a variable to check the deterioration of the precious metal catalyst.

Once the flag $F_3$ is determined in Step X50 or Step X55, Step 60 determines whether the termination condition of the determination of deterioration holds. The termination condition here indicates that the support temperature T is higher than the third prescribed temperature $T_3$. If the termination condition does not hold, the process returns to the main process in Step X70, and the sub-process $R_4$ is repeated. If the termination condition holds, the process proceeds to Step X80 which determines whether the flag $F_2$ is "1" or the flag $F_3$ is "1".

If at least either the flag $F_2$ or $F_3$ is "1", the process proceeds to Step X90. Step X90 notifies the driver of the deterioration of the oxidation catalyst 31 and the deterioration of zeolite and/or precious metal catalyst. If the process proceeds to a NO route in Step X80 or a notification has been sent to the driver in Step X90, the process proceeds to Step X100 where the flags $F_1$, $F_2$, and $F_3$, which indicate the results of determination, are reset to zero. Subsequently, the variables X and Y used for the determination of the deterioration and the flags $G_1$ and $G_2$ are reset to zero in Step X110. After that the timers "a" and "b" are halted to be reset, which leads to the end of the determination of the deterioration.

[4. Advantageous Effect]

According to the catalyst determining device of the present embodiment, comparison of differences $\Delta C$ in oxygen concentration between the two states of the oxidation catalyst 31 at different support temperatures T allows the detection of changes in the oxidation performance by the precious metal catalyst or changes in the adsorption and desorption performance by zeolite. This allows detection of the deterioration of the oxidation catalyst 31 due to decreased oxidation performance or adsorption and desorption performance, thereby properly determining the purifying performance of the oxidation catalyst 31.

Defining the temperature range for the determination of deterioration improves the accuracy of the determination, thereby properly determining the purifying performance of the oxidation catalyst 31. Specifically, the deterioration of the oxidation catalyst 31 is categorized into the deterioration of zeolite and the deterioration of precious metal catalyst, and the aforementioned temperature range ensures the determination of deterioration free from the influence of the deterioration of the precious metal catalyst, which enhances the stability of the determination of deterioration of zeolite. That is, the factors in the deterioration of the oxidation catalyst 31, i.e., the deteriorations of zeolite and/or the precious metal catalyst can be differentiated from each other.

When adsorption and desorption ability of zeolite is weakened, the difference (dC) between differences $\Delta C$ in the oxygen concentration with an increase in temperature, that is, the gradient of the line in the graph in FIG. 2A becomes small, which allows accurate determination of deterioration of zeolite of the oxidation catalyst 31, thereby properly determining the purifying performance of the oxidation catalyst 31.

A combination of the provisional determination and actual determination ensures the accurate determination of deteriorated zeolite in the oxidation catalyst 31, thereby properly determining the purifying performance of the oxidation catalyst 31.

Changing the second prescribed value $C_2$ serving as a threshold in response to the results of the provisional determination ensures the accurate determination of deteriorated zeolite in the oxidation catalyst 31, thereby properly determining the purifying performance of the oxidation catalyst 31.

[5. Modifications]

The embodiment of the present invention is described above. The present invention is, however, not limited to the embodiment and a variety of modifications are possible within the scope of the present invention.

In the above embodiment, the determination of deterioration of zeolite is performed such that the first determination unit 3b compares a difference dC between the differences $\Delta C$ in oxygen concentration at two different support temperatures T within the second region $R_2$ with the second prescribed value $C_2$. It is, however, not necessary for the two different support temperatures T to reside in the second region $R_2$. The deterioration of zeolite may be determined by comparing the difference dC ($\Delta C_2' - \Delta C_2$) between the first difference $\Delta C_2'$ in oxygen concentration at a support temperature T in the first region $R_1$ and the second difference $\Delta C_2$ in oxygen concentration at a support temperature T in the second region $R_2$ with the second prescribed value $C_2$. In this case also, the deterioration of zeolite can be determined at high accuracy, similar to the above-embodiment.

Instead of using the second prescribed value $C_2$ serving as a threshold, the first determination unit 3b may determine the deterioration of zeolite using the difference dC between the differences ΔC in oxygen concentration obtained at different support temperatures T of the oxidation catalyst 31. The smaller the difference dC is, the more the deterioration of zeolite is in progress. In this case, not only deterioration of zeolite is determined but also the progress in deterioration of zeolite can be determined quantitatively, which provides accurate purifying performance of the oxidation catalyst 31.

In the embodiment above, the provisional determination unit 3a determines possible deterioration of zeolite at a difference ΔC in oxygen concentration below the first prescribed value $C_1$. Alternatively, the deterioration of zeolite may be determined such that the smaller the difference ΔC in oxygen concentration is, the higher the possibility of deterioration of zeolite is. In this case, not only the determination of possibility of deterioration of zeolite, but also the degree of deterioration of zeolite may be determined.

Although in the above-embodiment, the upstream temperature sensor 24a and the upstream oxygen concentration sensor 25a are disposed upstream of the oxidation catalyst 31, these sensors may be eliminated from the upstream side. In this case, the temperature calculating unit 2a may calculate the support temperature T of the oxidation catalyst 31 based on the exit temperature $T_{out}$ detected by the downstream temperature sensor 24b. Examples of the calculation include preliminary mapping of the relationship of the exhaust flow rate, the exit temperature $T_{out}$, and the support temperature T and preliminary storing of a calculating equation to calculate the support temperature T using the exhaust flow rate and the exit temperature $T_{out}$.

Moreover, the concentration-difference calculating unit 2b may calculate the oxygen concentration of the exhaust flowing into the oxidation catalyst 31 (exhaust oxygen concentration) based on the driving condition of the engine 10 to determine the difference ΔC in oxygen concentration between the obtained exhaust oxygen concentration and the exit concentration $C_{out}$ detected by the downstream oxygen concentration sensor 25b may be obtained. In this case, the upstream sensors can be eliminated, which simplifies the configuration of the device. A temperature sensor and an oxygen concentration sensor, which are provided downstream of the catalyst in an exhaust system in general vehicles, may be used for the determination of deterioration. In this way, additional sensors are not necessary, which suppresses cost increase. The oxygen concentration sensor may be an oxygen sensor which detects if the air-fuel ratio is higher than the theoretical air-fuel ratio or may be replaced with a more accurate air-fuel ratio sensor such as wideband air-fuel ratio sensor. An air-fuel ratio sensor may be used instead of the upstream oxygen concentration sensor 25a and the downstream oxygen concentration sensor 25b.

The exhaust temperature $T_{IN}$ flowing into the oxidation catalyst 31 may be presumed based on the driving condition of the engine 10 to calculate the support temperature T of the oxidation catalyst 31 using the presumed exhaust temperature $T_{IN}$. Alternatively, the support temperature T may be directly calculated based on the condition of the engine 10. In this way, the temperature sensors for detecting exhaust temperatures are not necessary. For example, even without the temperature sensors, the same determination of deterioration as the above embodiment can be performed by comparing the difference in oxygen concentration after one minute from the start of the engine 10 to the difference in oxygen concentration at five minutes from the start of the engine. Under the assumption that the temperature increases similarly after the engine 10 starts, the time at which the temperature reaches the first prescribed temperature $T_1$ and the time at which the temperature reaches temperatures in the second region $R_2$ are obtained in advance through preliminary tests and experiments.

When the first determination unit 3b receives the results of determination on possible deterioration of zeolite from the provisional determination unit 3a, the revised second prescribed value $C_2'$ may be changed to a smaller value than the second prescribed value $C_2$. In this way, before the deterioration proceeds to some extent, the deterioration of the zeolite cannot be determined. Accordingly, the results of determination of the provisional determination unit 3a override, and the criteria for determining the deterioration by the first determination unit 3b can be eased.

Steps T30, T35, and T40 in the sub-process $R_1$ are not essential. For example, when the sub-process $R_1$ is executed only once, these steps are not necessary. When the sub-process $R_1$ is repeated and the results of determination are overwritten every time, these steps are also omitted. Step T40 in the sub-process $R_1$ may determine possible deterioration of zeolite if the count X reaches a certain number, instead of the comparison of the count X with the count Y. In this case, only Step T40 is changed but the rest of the steps are the same as those in the sub-process $R_1$. The sub-process $R_{2B}$ and the sub-process $R_4$ also stay the same.

The prescribed time $t_2$, i.e., the waiting time in Step S150 in the main process may be set to "0". In other words, Step S150 may be omitted; if the support temperature T is equal to or higher than the third prescribed temperature $T_3$, i.e., if the process may proceed from Step S100 to a YES route, the process proceeds to the sub-process $R_4$.

In the above-embodiment, the HC-adsorption rate of zeolite shown in FIG. 2A is described under a condition that the temperature $T_x$ and the third prescribed temperature $T_3$ are substantially the same. In a case where the temperature $T_x$ is slightly lower than the third prescribed temperature $T_3$ as shown in FIG. 2A, the deterioration of the precious metal catalyst can be determined at a support temperature T equal to or higher than the temperature $T_x$. In this case, the temperature $T_3$ in Step S100 in the main process may be replaced by the temperature $T_x$.

Although in the above-embodiment, the calculating unit 2, the deterioration determining unit 3 and the notification control unit 4, which determine the deterioration of the catalyst, are provided as functional elements of the ECU 1, those elements may be provided in one of the electronic control units of the vehicle. A notification means to a driver is not limited to one described in the embodiment above. Alternatively, sound may be used to report results of determination with a speaker. Moreover, the notification means may be omitted and the results of determination may be written on a storage unit in the ECU 1. In other words, information relating to the determination of deterioration of the catalyst may be included in dialogue information provided from the ECU 1 at a periodic inspection of a vehicle. This facilitates the maintenance of the vehicle.

The deterioration determining device of the present invention can be applied to an oxidation catalysts provided in a various vehicles such as cars and trucks. The application of the deterioration determining device of the present invention is not limited to the oxidation catalyst for an engine in a vehicle or to a diesel engine. The deterioration determining device can be applied to an oxidation catalyst in a gasoline engine and the engine 10 can have any configurations.

REFERENCE SIGNS LIST

1 ECU (engine electronic control unit)
2 calculating unit 2a temperature calculating unit (temperature acquiring unit)
2b concentration-difference calculating unit (calculating unit)
3 deterioration determining unit (determination unit)
3a provisional determination unit
3b first determination unit
3c second determination unit
4 notification control unit
10 diesel engine (engine)
22 outlet passage
24a upstream temperature sensor
24b downstream temperature sensor
25a upstream oxygen concentration sensor
25b downstream oxygen concentration sensor
30 catalyst unit
31 oxidation catalyst
ΔC difference in oxygen concentration
$\Delta C_2'$ first difference in oxygen concentration
$\Delta C_2$ second difference in oxygen concentration
dC difference
$T_1$ first prescribed temperature (desorption initiation temperature)
$T_2$ second prescribed temperature (oxidation initiation temperature)
$C_1$ first prescribed value
$C_2$ second prescribed value (threshold)

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A catalyst determining device comprising:
    an oxidation catalyst disposed in an outlet passage in an engine, the oxidation catalyst comprising an adsorption substance for adsorbing and desorbing an exhaust component in exhaust and a catalytic substance capable of oxidizing the exhaust component;
    a calculating unit for calculating a difference in oxygen concentration between upstream and downstream of the oxidation catalyst; and
    a determination unit for determining deterioration of the oxidation catalyst through comparison of a plurality of the differences in oxygen concentration obtained at different temperatures of the oxidation catalyst by calculating unit.

2. The catalyst determining device according to claim 1, wherein the determination unit determines the deterioration of the adsorption substance based on the plurality of differences in oxygen concentration at the different temperatures of the oxidation catalyst within a range equal to or lower than an oxidation initiation temperature at which oxidation of the exhaust component is initiated in the oxidation catalyst.

3. The catalyst determining device according to claim 2, wherein the determination unit determines the deterioration of the adsorption substance through comparison of the difference in oxygen concentration obtained by the calculating unit at a temperature of the oxidation catalyst lower than a desorption initiation temperature at which the exhaust component initiates desorption from the adsorption component with the difference in oxygen concentration obtained by the calculating unit at another temperature of the oxidation catalyst within a range from the desorption initiation temperature to the oxidation initiation temperature.

4. The catalyst determining device according to claim 3, wherein the determination unit determines the deterioration of the catalytic substance based on the difference in oxygen concentration at a temperature of the oxidation catalyst higher than the oxidation initiation temperature after the determination of deterioration of the adsorption substance, and distinguishes factors causing the deterioration of the oxidation catalyst based on the result of the determination of deterioration of the adsorption substance and the result of the determination of deterioration of the catalytic substance.

5. The catalyst determining device according to claim 1, wherein the determination unit determines the deterioration of the oxidation catalyst if a difference between the plurality of differences in oxygen concentration is lower than a threshold.

6. The catalyst determining device according to claim 5, wherein the determination unit comprises a provisional determination unit for provisionally determining possible deterioration of the oxidation catalyst if the difference in oxygen concentration obtained by the calculating unit is lower than a first prescribed value at a temperature of the oxidation catalyst lower than a desorption initiation temperature at which the exhaust component initiates desorption from the adsorption component.

7. The catalyst determining device according to claim 6, wherein the determination unit changes the threshold for the difference between the plurality of differences in oxygen concentration with respect to the determination of deterioration of the oxidation catalyst in response to the result of the provisional determination by the provisional determination unit.

8. The catalyst determining device according to claim 7, further comprising a temperature acquiring unit for acquiring the temperature of the oxidation catalyst, wherein the determination unit differentiates the states of the oxidation catalyst at different temperatures according to the temperature (T) acquired by the temperature acquiring unit.

9. A method of determining deterioration of an oxidation catalyst disposed in an outlet passage in an engine, the oxidation catalyst including an adsorption substance for adsorbing and desorbing an exhaust component in exhaust and a catalytic substance capable of oxidizing the exhaust component, the method comprising:
    calculating a difference in oxygen concentration between upstream and downstream of the oxidation catalyst as a first difference in oxygen concentration if a temperature of the oxidation catalyst is a first temperature;
    calculating a difference in oxygen concentration between upstream and downstream of the oxidation catalyst as a second difference in oxygen concentration if the temperature of the oxidation catalyst is a second temperature higher than the first temperature; and
    performing the determination of deterioration of the oxidation catalyst by comparing the first difference in oxygen concentration with the second difference in oxygen concentration.

* * * * *